United States Patent [19]

Tomioka et al.

[11] 4,372,486
[45] Feb. 8, 1983

[54] REVERSIBLE EXPANSION VALVE

[75] Inventors: Soichiro Tomioka; Yasuo Komiya, both of Iruma, Japan

[73] Assignee: Kabushiki Kaisha Saginomiya Seisakusho, Japan

[21] Appl. No.: 256,553

[22] Filed: Apr. 22, 1981

[30] Foreign Application Priority Data

Apr. 25, 1980 [JP] Japan .............................. 55-55920[U]

[51] Int. Cl.³ .............................................. F25B 41/04
[52] U.S. Cl. .................................. 236/92 B; 62/225; 137/513.3
[58] Field of Search ............... 62/225, 324.1, 324.6; 236/92 B; 137/599.2, 513.3

[56] References Cited

U.S. PATENT DOCUMENTS

| 706,573 | 8/1902 | Lindsay | 137/599.2 |
| 3,205,675 | 9/1965 | Matthies | 62/225 X |
| 3,874,409 | 4/1975 | Lee | 137/599.2 |
| 4,003,401 | 1/1977 | Haring | 137/599.2 |
| 4,071,038 | 1/1978 | Robinson | 137/599.2 X |
| 4,236,381 | 12/1980 | Imral et al. | 62/324.6 X |
| 4,296,221 | 10/1981 | Steele, Jr. | 137/599.2 X |
| 4,308,723 | 1/1982 | Ecker | 62/324.6 X |

FOREIGN PATENT DOCUMENTS

| 49-11099 | 3/1974 | Japan . |
| 53-13252 | 5/1978 | Japan . |
| 55-93767 | 6/1980 | Japan . |

Primary Examiner—William E. Tapolcai
Attorney, Agent, or Firm—Brumbaugh, Graves, Donohue & Raymond

[57] ABSTRACT

An electrically operated reversible expansion valve. It has a valve body formed with a primary port, a secondary port, a valve seat defined between the primary and secondary ports, and a slide bore in an opposing relation to said valve seat. A valve needle is supported by the slide bore. In order to prevent the fluid from being admitted into a bimetal chamber through the slide bore, a bypass is provided between the primary port and the slide bore.

7 Claims, 8 Drawing Figures

REVERSIBLE EXPANSION VALVE

BACKGROUND OF THE INVENTION

The present invention relates to a reversible expansion valve having a one way check valve mechanism which allows the valve to operate stably whether the flow direction of a fluid such as a refrigerant may be forward or reverse. An expansion valve according to the present invention closes the check valve when a fluid flows in the forward direction and operates in the same way as a conventional expansion valve of one-way type. However, the check valve in the art will be opened when the fluid flow is reversed to release a pressure which has entered a bimetal chamber of the valve to the low pressure side thereby ensuring a reverse mode of operation without a pressure increase in the bimetal chamber or accumulation of the fluid in the chamber. In this way, however, no specific means is provided to prevent the fluid from entering the bimetal chamber. Moreover, the discharge of fluid once accumulated in the bimetal chamber is performed only when the fluid flow is in one of the two directions.

SUMMARY OF THE INVENTION

It is therefore an object of the present invention to provide a reversible expansion valve in which a fluid such as refrigerant can be well prevented from entering the chamber.

It is another object of the invention to provide a reversible expansion valve which can discharge fluid which has entered the chamber.

To achieve the above mentioned objects, there is essentially provided a reversible expansion valve comprising a valve body formed with a primary port, a secondary port, a valve seat defined between the primary and secondary ports, and a slide bore in an opposing relation to said valve seat; a valve needle inserted through said slide bore and adapted to engage the valve seat; a chamber accommodating control means therein to regulate the valve needle; and communication passage means provided between said primary port and said slide bore and having a check valve therein.

DETAILED DESCRIPTION OF THE EMBODIMENTS

Figure 1:
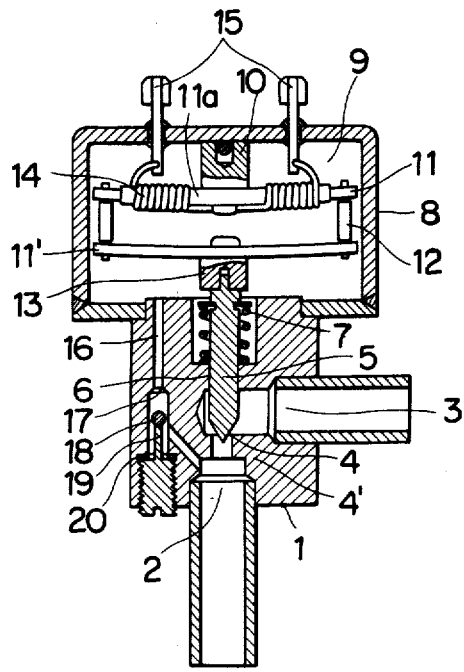
FIG. 1 is a vertical section of a prior art reversible expansion valve.

Preferred embodiments of the present invention will be described with reference to the accompanying drawings. FIG. 1 illustrates a prior art valve arrangement of the type described to which the present invention constitutes an improvement. The prior art valve includes a valve body 1 which is formed with a high pressure or primary port 2 and a low pressure or secondary port 3. A part 4' of the valve body 1 forming a partition between the ports 2 and 3 is shaped with a valve seat 4 adapted to bear a conical tip of a valve member 5 which is formed as a needle. A slide bore 6 is formed in the valve body 1 in an opposing relation to the valve seat 4.

The valve member 5 is slidably supported in said bore 6 of the valve body 1 and constantly biased by a compression spring 7 accommodated within the valve body into abutting engagement with the valve seat 4, that is, to the valve opening position.

The valve body 1 carries a casing 8 rigidly therewith at its upper end. The casing 8 and the top of the valve body 1 define a control chamber 9 in which first and second plates 11 and 11' of bimetallic material, for e.g. are accommodated. The first bimetal plate 11 is mounted to the casing 8 at its intermediate portion 11a by a support member 10 which is formed of a suitable electrically and thermally insulating material such as phenol resin. The second bimetal plate 11' is disposed below the first bimetal plate 11 and supported thereby through elongate supports 12. A cap shaped member 13 made of electrically and thermally insulating material such as phenol resin is rigidly carried on an intermediate portion of the underside of the lower bimetal plate 11'. The cap 13 is engaged by the other end of the valve needle 5 opposite to the conical tip. A heater coil 14 is wound on the upper bimetal plate 11 through a thin layer of electrically insulating material as typified by Teflon. Metallic terminal members 15 are fixed to the casing 8 to supply a voltage from a voltage source to the heater coil 14.

A high pressure discharge passage 16 bored in the valve body 4 provides fluid communication between the bimetal chamber 9 and the primary port 2. This fluid communication is controlled by a ball 18 which is detachably supported on a stop 19 and functions as a one way check valve element. At a predetermined upper part, the high pressure discharge passage 16 is formed with a valve seat 17 selectively engaged by the valve ball 18.

When the valve having the above construction is conditioned for its normal or forward operation wherein a fluid flows from the high pressure port 2 to the low pressure port 3, the valve ball 18 discommunicates the bimetal chamber 9 and the high pressure port 2 from each other engaged with the valve seat 17 under the fluid pressure. The valve in this mode operates in the same way as an ordinary expansion valve of the one-way type; the valve needle 5 is moved into and out of contact with the valve seat 4 in accordance with the deformation of the bimetal plate 11 caused by heat generation at the heater coil 14. When the valve is operated in its reverse mode, a fluid is communicated to the secondary port 3 which is a high pressure port this time and, through the bore 6, admitted in the bimetal chamber 9. The high pressure fluid in the bimetal chamber 9 is discharged to the primary port 2 via the passage 16 which will have been unblocked then by the valve ball 18 in this mode of operation, so that the bimetal chamber is free from an increase in its internal pressure or accumulation of the fluid therein. The bimetal plates and other components of the valve are thus properly actuated ensuring the expected reverse mode of operation.

Figure 2:
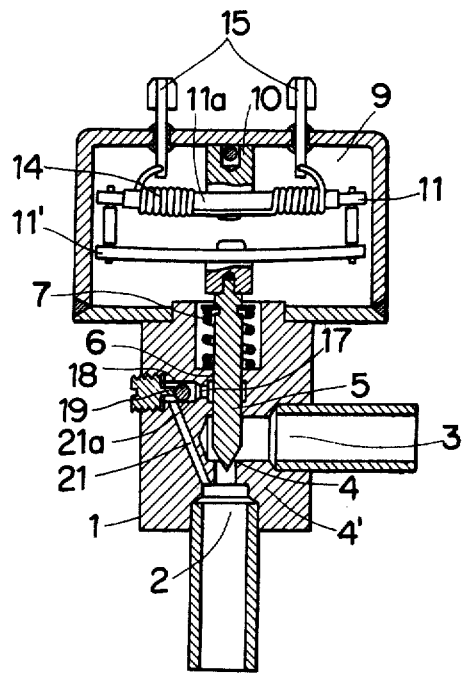
FIGS. 2-5 are vertical sections of various embodiments of a reversible expansion valve according to the present invention.

A first embodiment of the present invention has a structure which in some ways is substantially the same as the prior art valve and is shown in FIG. 2. The expansion valve of FIG. 2 has a high pressure discharge passage 21 which extends between a primary port 2 and a slide bore 6 of a valve body 1. The passage 21 is made up of a first section 21a extending transversely from the slide bore 6 and a second section (no numeral) extending downward from the first section 21a into communication with the primary port 2. The valve body 1 is formed with a valve seat 17 at the radially innermost end of the transverse passage section 21a. A check valve 18 in the form of a ball is disposed in the transverse passage section 21a to be movable into and out of engagement with the valve seat 17 while a stop 19 extending transversely into the passage section 21a limits the movement of the valve ball 18 away from the valve seat 17.

When the valve thus constructed is operated in a reverse mode, a high pressure fluid which will otherwise be penetrated into the bore 6 will be bypassed therefrom through the passage 21 to the primary port now at the low pressure side instead of being allowed into a chamber.

Figure 3:
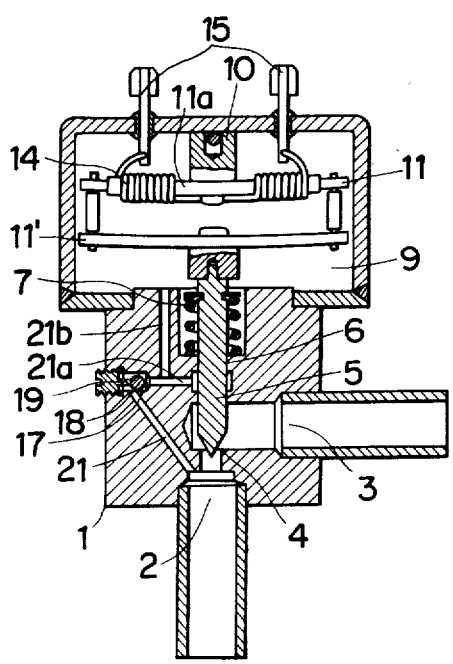

FIG. 3 illustrates a second embodiment of the present invention in which the high pressure discharge passage 21 of FIG. 2 is modified to include an auxiliary discharge passage 21b. As shown, this passage 21b is branched off vertically from the transverse passage section 21a to open into the chamber 9. Such a valve design will positively discharge even that part of a high pressure which may have entered the chamber 9 during a reverse mode of operation of the valve.

Figure 4:
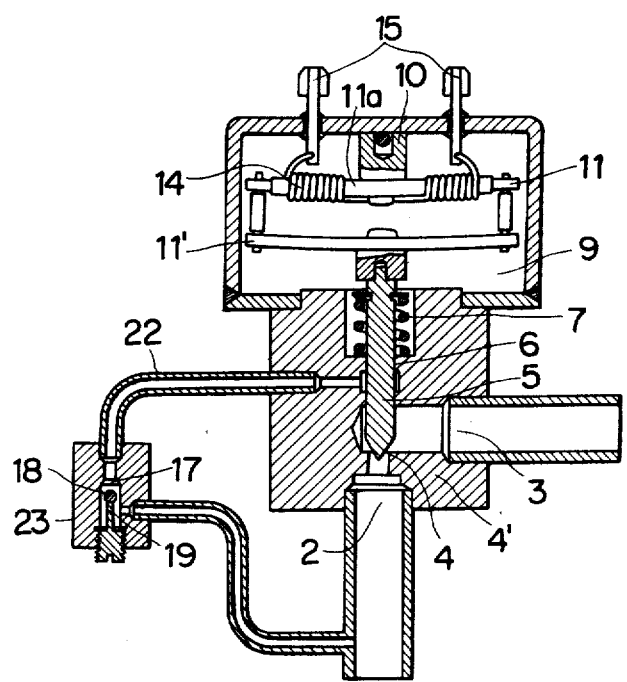

A third embodiment of the present invention indicated in FIG. 4 employs a piping 22 outside the valve body to constitute the high pressure discharge passage. An intermediate part of the piping 22 is formed by an auxiliary valve body 23 independent of the main valve body 1. The auxiliary valve body 23 has a vertical passageway and a valve seat 17 formed in an upper portion of said passageway. A check valve or valve ball 18 is disposed in said vertical passage to be movable into and out of contact with the valve seat 17 while a stop 19 limits the movement away from the valve seat.

Where a check valve assembly is positioned outside the valve body 1 as shown in FIG. 4 in combination with the external pipework 22, the outlet of the check valve can have a fluid communication with a conduit immediately downstream of the expansion valve with respect to the reverse mode of operation or with a conduit immediately downstream of a heat exchanger inside a room. This permits the use of a relatively large pressure differential between the high pressure side and the low pressure side and thereby facilitates advantageous discharge of a fluid pressure from the higher side to the lower side.

Figure 5:
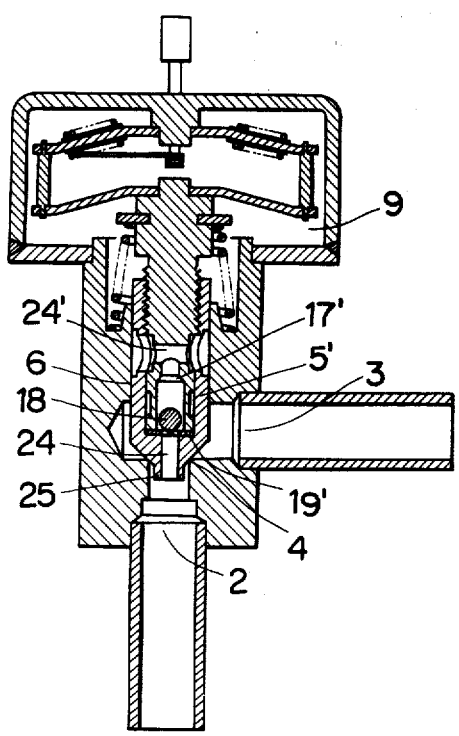

The check valve may be built in the valve needle as shown in FIG. 5 which represents a fourth embodiment of the present invention. In FIG. 5, a modified valve needle 5' has an axially extending high pressure discharge passage 24 which provides fluid communication between the primary port 2 of the valve and the bore 6 in which the valve needle 5' is slidable. Said valve needle has a laterally extending passage 24' therein to provide fluid communication between the slide bore 6 and said axially extending discharge passage 24. Within the passageway 24, a check valve formed as a ball 18 is supported by an air permeable stop 19' to be movable into and out of contact with a valve seat 17' located in an upper portion of the passage 24.

The valve needle 5' has an annular extension at its lower end as viewed in FIG. 5 so that the open end of the valve needle can advance deep beyond the valve seat 4 of the valve body. It therefore follows that in a reverse mode of the valve a substantial pressure differential develops between the bore portion 6 and the low pressure side promoting effective discharge of the fluid from the high pressure side to the low pressure side.

Figure 6A:
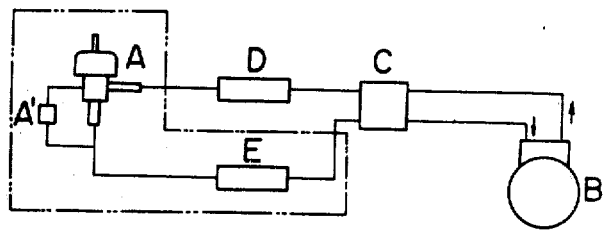
FIGS. 6A-6C illustrates some examples of a refrigeration system using an expansion valve embodying the present invention.
Figure 6B:
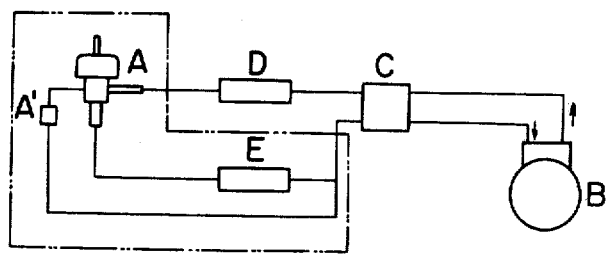
Figure 6C:
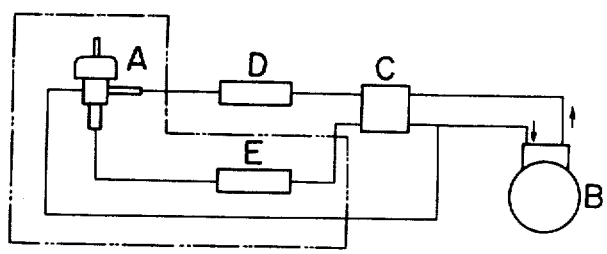

FIGS. 6A, 6B and 6C show some examples of a refrigeration system incorporating an expansion valve according to the present invention. The refrigeration systems commonly include an expansion valve A of the present invention, a compressor B, a four way valve C, a heat exchanger D outside a room and a second heat exchanger E inside the room. If the expansion valve A has a check valve assembly A' outside the valve body, the check valve assembly A' can be connected with a conduit immediately downstream of the expansion valve A as shown in FIG. 6A or with a conduit immediately downstream of the inside heat exchanger as shown in FIG. 6B. The valve arrangement in FIG. 6A or 6B ensures a substantial pressure differential which promotes effective discharge of a fluid from the high pressure side to the low pressure side.

The valve A in FIG. 6C is connected with the suction side of the compressor without the intermediary of the independent check valve A'. This kind of piping needs an unfavorably long piping, though the effect obtainable therewith is comparable with that of the pipings of FIGS. 6A and 6B.

In summary, it will be seen that the present invention provides a reversible expansion valve which has a high pressure discharge passage extending from a bore portion of its valve body in which a valve member is slidable, and a one way check valve arranged within the passage. Hence, during a reverse mode of operation, a high pressure fluid such as a refrigerant which has entered a chamber can be discharged effectively out therefrom and thus it ensures proper actions of the valve control means and its members.

What is claimed is:

1. A reversible expansion valve comprising
a valve body formed with a primary port, a secondary port, a valve seat defined between the primary and secondary ports, and a slide bore in an opposing relation to said valve seat;
a valve needle inserted through said slide bore and adapted to engage the valve seat;
a control chamber accommodating a control means therein to regulate the valve needle; and
means for protecting against fluid leakage into said control chamber, comprising a communication passage provided between said primary port and said slide bore and having a check valve therein.

2. A reversible expansion valve according to claim 1, wherein said means for protecting against fluid leakage includes a discharge passage bored in the valve body.

3. A reversible expansion valve according to claim 2, further including an auxiliary discharge passage bored in the valve body between the bimetal chamber and said discharge passage.

4. A reversible expansion valve according to claim 1, wherein said means for protecting against fluid leakage includes a piping provided outside the valve body and having an auxiliary valve body at an intermediate part thereof to accommodate the check valve therein.

5. A reversible expansion valve according to claim 1, wherein said means for protecting against fluid leakage includes an axially extending discharge passage bored in the valve needle, said valve needle having a laterally extending passage bored therein to provide fluid communication between the slide bore and said axially extending discharge passage.

6. A reversible expansion valve according to claim 1, wherein said means for protecting against fluid leakage includes an opening in an inner wall of the slide bore.

7. A reversible expansion valve according to claim 1, wherein said control means includes a bimetal control member.

* * * * *